UNITED STATES PATENT OFFICE.

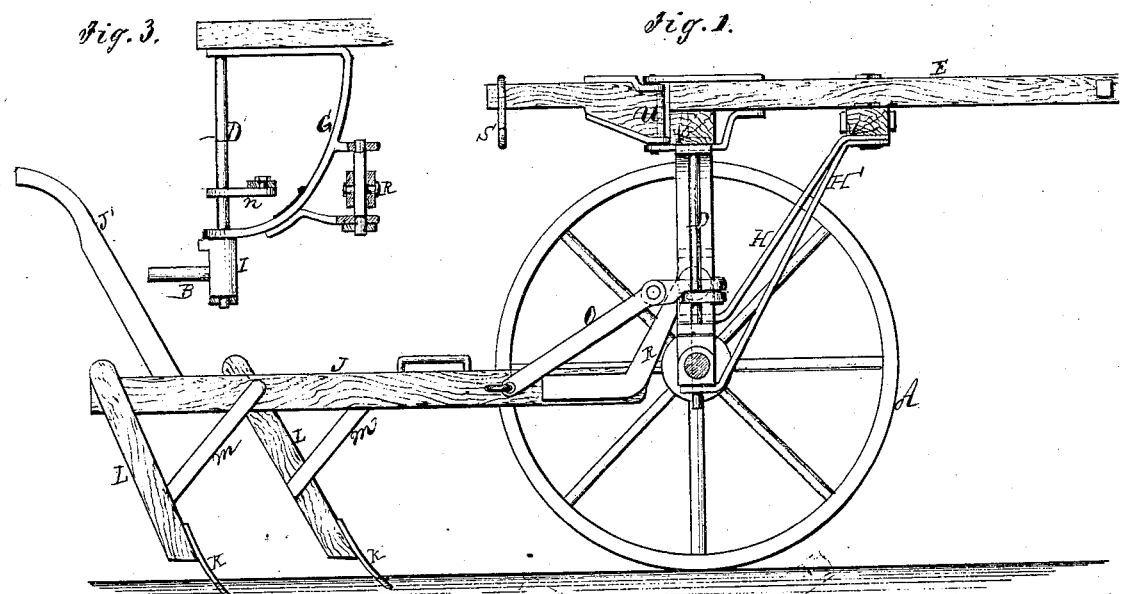

NICHOLAS WERTS, OF MAGNOLIA, ILLINOIS.

IMPROVEMENT IN CULTIVATORS.

Specification forming part of Letters Patent No. 102,631, dated May 3, 1870.

*To all whom it may concern:*

Be it known that I, NICHOLAS WERTS, of Magnolia, in the county of Putnam and State of Illinois, have invented a new and useful Improvement in Cultivators; and I do hereby declare that the following is a full, clear, and exact description thereof, which will enable others skilled in the art to make and use the same, reference being had to the accompanying drawings forming part of this specification.

This invention relates to plows arranged in gangs for cultivating the soil; and consists in the construction and arrangement of parts hereinafter described.

In the accompanying drawings, Figure 1 is a sectional side elevation of the machine. Fig. 2 is a top or plan view, partly in section. Fig. 3 is a detailed view of the supporting-bracket, showing an arm of one of the wheels.

Similar letters of reference indicate corresponding parts.

This cultivator is mounted on two wheels, A A, which revolve on arms B, supported by rods D hanging from the cross-piece of the frame C. E E represent two longitudinal bars, which are supported on the cross-piece C and on a shorter cross-piece, F. G G represent brackets which are attached to the under side of the cross-piece C, supported by two braces, H H, attached to the short cross-piece F, as seen in Fig. 1. The brace H' reaches down and connects with the lower end of the rods D. I represents the wheel-arm pieces on each side, through which the rods D D pass, and to which they are rigidly attached, so that when the wheel-arms turn laterally the rods are turned. J J represent the plow-beams, to which the plows or teeth K are attached by the standards L. M are braces from the beams for supporting the standards. The beams J J are connected with the vertical rods D by means of arms n, which are fast on the rods D, and by the jointed connections O, which are fastened to the beams at the points p. The connections O are in two parts, there being a joint at the points q q. The forward ends of the beams are connected with the brackets G by swivel-joints, as seen at R R. The result of this arrangement is that the holder of the cultivator or plow is able to vary the direction of the wheels to suit circumstances. The arms B of the wheel are governed by the position of the arms n on the vertical rods D, and these arms n are controlled by the position of the beams J J, which are under the control of the holder. J' represents the handles. S S are hooks on the rear ends of the bars E E, by which the plows may be supported clear of the ground from the staples T T on the beams. There is a joint in one of the bars E, as seen at u, for allowing of this adjustment.

By means of the jointed connections described the plow-holder has the machine entirely under his control, and is able to avoid stones, stumps, or other obstructions with the greatest ease, thus rendering this description of agricultural implements of the greatest importance, especially on new land.

Having thus described my invention, I claim as new and useful and desire to secure by Letters Patent—

1. The brackets G, vertical rods D, with crank-levers n q, pivoted arms O, angular connections R, and braces H' H, as constructed and arranged with beams J, C, and F, substantially in the manner and for the purpose as herein shown and described.

2. In combination with the above, the hinged extension u of the arm E, substantially as shown and described.

NICHOLAS WERTS.

Witnesses:
J. B. BROTHERHOOD,
W. M. FYFFE.